US012811980B2

(12) United States Patent
Huth et al.

(10) Patent No.: US 12,811,980 B2
(45) Date of Patent: Nov. 24, 2026

(54) METHOD FOR GENERATING A HONEYPOT

(71) Applicant: Robert Bosch GmbH, Stuttgart (DE)

(72) Inventors: Christopher Huth, Heilbronn (DE); Dominik Germek, Berlin (DE); Niclas Ilg, Ammerbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 95 days.

(21) Appl. No.: 18/808,399

(22) Filed: Aug. 19, 2024

(65) Prior Publication Data

US 2025/0112957 A1 Apr. 3, 2025

(30) Foreign Application Priority Data

Sep. 29, 2023 (DE) ..................... 10 2023 209 600.5

(51) Int. Cl.
*H04L 9/40* (2022.01)

(52) U.S. Cl.
CPC ................................ *H04L 63/1491* (2013.01)

(58) Field of Classification Search
CPC ........................ H04L 63/1491; H04L 63/1466
See application file for complete search history.

(56) References Cited

U.S. PATENT DOCUMENTS

| | | | | |
|---|---|---|---|---|
| 12,368,745 | B1 * | 7/2025 | Guo | G06F 16/9024 |
| 2018/0375897 | A1 * | 12/2018 | Kawasaki | H04L 41/12 |
| 2022/0191224 | A1 * | 6/2022 | Ståhlberg | G06F 21/554 |
| 2023/0319097 | A1 * | 10/2023 | Murphy | G06F 21/566 |
| 2023/0370495 | A1 * | 11/2023 | Desai | H04L 63/1425 |
| 2024/0372885 | A1 * | 11/2024 | Moore | G06F 40/56 |
| 2025/0039235 | A1 * | 1/2025 | Hanes | H04L 63/1416 |
| 2025/0063065 | A1 * | 2/2025 | Mermoud | H04L 63/1416 |
| 2025/0068741 | A1 * | 2/2025 | Lafon | G06F 21/554 |
| 2025/0077238 | A1 * | 3/2025 | Obando Chacon | G06F 40/284 |
| 2025/0103958 | A1 * | 3/2025 | Germek | H04L 63/1491 |
| 2025/0112957 | A1 * | 4/2025 | Huth | H04L 63/1491 |
| 2025/0233886 | A1 * | 7/2025 | Huth | G06F 40/30 |

OTHER PUBLICATIONS

Unknown author, "Large language model—Wikipedia", 42 pages, printed: Jan. 6, 2026. (Year: 2026).*

* cited by examiner

*Primary Examiner* — Ponnoreay Pich
(74) *Attorney, Agent, or Firm* — NORTON ROSE FULBRIGHT US LLP

(57) ABSTRACT

A method for generating a honeypot for a target system. The method includes training a large language model to respond to operating system command line interface commands like a command line interface of the target system, and generating a honeypot that uses the trained large language model to respond to operating system command line interface commands it receives.

14 Claims, 2 Drawing Sheets

METHOD FOR GENERATING A HONEYPOT

CROSS REFERENCE

The present application claims the benefit under 35 U.S.C. § 119 of German Patent No. DE 10 2023 209 600.5 filed on Sep. 29, 2023, which is expressly incorporated herein by reference in its entirety.

FIELD

The present invention relates to methods for generating a honeypot.

BACKGROUND INFORMATION

The number of networked data processing devices (including embedded devices) is increasing rapidly. An important aspect of all of these devices, be they server computers on the Internet or control units in the automotive or IoT sector, is product safety. Honeypots are dummy sites that imitate such a valuable (target) system in order to attract attackers and to gain information about their attack strategies and targets. Honeypots are an established threat analysis tool, especially in enterprise IT, and are by now also being used in the (industrial) internet of things ((I)IoT) sector. Although honeypots are a very useful tool to supplement the cybersecurity strategy, implementing suitable honeypots for the specific need and the particular target system requires a lot of manual work by experts.

Approaches that make easier provisioning (in particular configuration) of a suitable honeypot possible are therefore desirable.

SUMMARY

According to various example embodiments of the present invention, a method for generating a honeypot for a target system is provided, comprising training a large language model to respond to operating system command line interface commands like a command line interface of the target system, and generating a honeypot that uses the trained large language model to respond to operating system command line interface commands it receives (e.g., via a computer network) (i.e., the honeypot is configured in such a way that it forwards incoming command line interface commands to the large language model (i.e., generates corresponding prompts) and, according to the outputs of the large language model, responds to the command line interface commands).

In other words, according to various example embodiments of the present invention, a command line interface of a target system (typically an operating system command line interface, such as a shell) is simulated by means of a correspondingly trained large language model. Examples in this respect are a secure shell (SSH), a power shell, or another command line interpreter.

The method according to the present invention described above makes extensive simulation of an operating system command line interface (e.g., a shell) possible. No manual implementation of commands (e.g., shell commands) is required for this purpose. Command line interfaces of various operating systems can be mimicked (simulated). The use of such simulations is substantially risk-free (also in case the language model fails) (with respect to a compromise of the honeypot by means of the command line interface, since the command line interface is only simulated and thus does not give the attacker any dangerous tools).

Various exemplary embodiments of the present invention are specified below.

Exemplary embodiment 1 is a method for generating a honeypot, as described above.

Exemplary embodiment 2 is the method according to exemplary embodiment 1, comprising generating the honeypot with an output filter that filters outputs of the large language model with regard to an output filter criterion before they are used as responses to operating system command line interface commands that the honeypot has received.

For example, the filter criterion may include filtering out implausible (e.g., syntactically incorrect) and/or confidential information. This increases the credibility of the honeypot or prevents secret information from being revealed.

Exemplary embodiment 3 is the method according to exemplary embodiment 1 or 2, comprising generating the honeypot with an input filter that filters operating system command line interface commands that the honeypot has received, before they are supplied to the large language model for generating responses to the operating system command line interface commands that the honeypot has received.

For example, the filter criterion may include that operating system command line interface commands that could cause false (implausible) outputs (and thus responses) are filtered out. In addition, inputs that could have a negative influence on a further training of the large language model (e.g., online training) can be filtered out.

Exemplary embodiment 4 is the method according to one of exemplary embodiments 1 to 3, comprising continuing to train the large language model on the basis of the behavior of the attacker in response to responses, generated by means of the large language model, to the command line interface commands.

For example, training can take place such that rewards are given if an attacker remains on the honeypot after a response (i.e., does not discontinue the communication) or continues to pursue a particular attack (e.g., in the sense of reinforcement learning from human feedback).

Exemplary embodiment 5 is a honeypot generation unit configured to perform the method according to one of exemplary embodiments 1 to 4.

Exemplary embodiment 6 is a computer program comprising commands that, when executed by a processor, cause the processor to perform a method according to one of exemplary embodiments 1 to 4.

Exemplary embodiment 7 is a computer-readable medium storing commands that, when executed by a processor, cause the processor to perform a method according to one of exemplary embodiments 1 to 4.

Exemplary embodiment 8 is a honeypot (or data processing device implementing a honeypot) that uses a large language model (which is trained to respond to operating system command line interface commands like a command line interface of the target system) to respond to operating system command line interface commands it receives (e.g., via a computer network) (i.e., the received command line interface commands (filtered by an input filter where applicable) are respectively supplied to the large language model, and the corresponding outputs of the large language model (which are filtered by an output filter where applicable) are used as responses to the command line interface commands).

In the figures, similar reference signs generally refer to the same parts throughout the different views. The figures are not necessarily to scale, wherein emphasis is instead generally placed on representing the principles of the present invention. In the following description, various aspects are described with reference to the following figures.

DETAILED DESCRIPTION OF EXAMPLE EMBODIMENTS

The following detailed description relates to the figures, which, for clarification, show specific details and aspects of this disclosure in which the present invention can be implemented. Other aspects can be used, and structural, logical, and electrical changes can be carried out without departing from the scope of protection of the present invention. The various aspects of this disclosure are not necessarily mutually exclusive since some aspects of this disclosure can be combined with one or more other aspects of this disclosure to form new aspects.

Various examples are described in more detail below.

Figure 1:
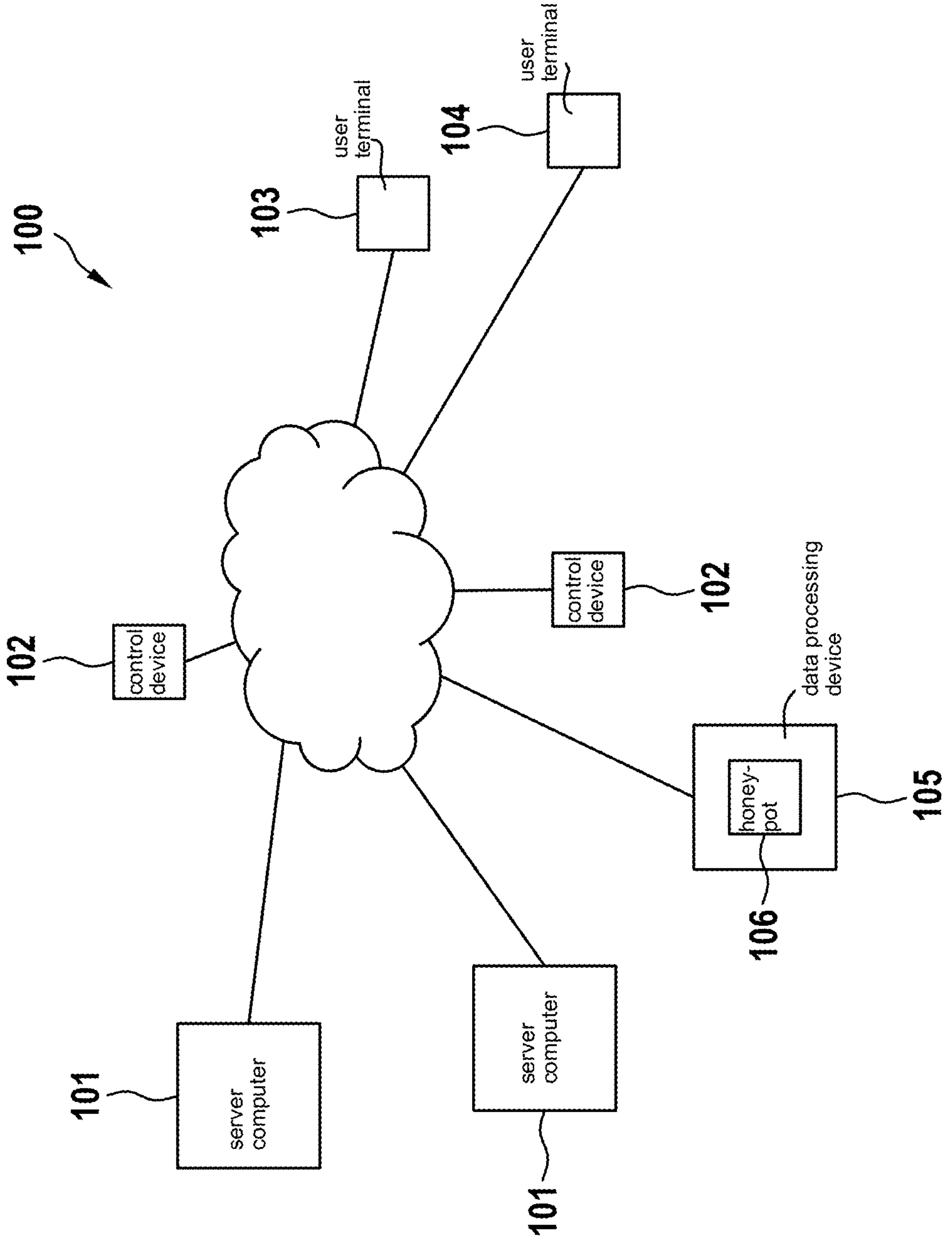
FIG. 1 shows a computer network, according to an example embodiment of the present invention.

FIG. 1 shows a computer network 100. The computer network 100 contains a plurality of data processing devices 101-105 interconnected by communication links. The data processing devices 101-105 include, for example, server computers 101 and control devices 102 as well as and user terminals 103, 104.

Server computers 101 provide various services, such as internet pages, banking portals, etc. A control device 102 is, for example, a control unit for a robotic device, such as a control unit in an autonomous vehicle. The server computers 101 and control devices 102 thus perform various tasks, and a server computer 101 or a control device 102 can typically be accessed from a user terminal 103, 104. This is in particular the case if a server computer 101 offers functionality, such as a banking portal, to a user. However, a control device 102 may also make outside access possible (e.g., so that it can be configured). Depending on the task of a server computer 101 or control device 102, the computer or device may store safety-relevant data and perform safety-relevant tasks. Accordingly, they must be protected against attackers. For example, through a successful attack, an attacker using one of the user terminals 104 could gain ownership of secret data (such as keys), manipulate accounts, or even manipulate a control device 102 such that an accident occurs.

A security measure against such attacks is a so-called honeypot 106 (implemented by one of the data processing devices 105). It appears to provide a functionality and thus serves as bait to attract potential attackers. However, it is isolated from secret information or critical functionality so that attacks on it take place in a controlled environment and the risk of impairing the actual functionality is minimized. It thus makes it possible to gain knowledge about attacks on a target system (e.g., one of the server computers 101 or one of the control devices 102), and thus the threat landscape, and to respond to them by implementing suitable measures on the target system without these attacks endangering the target system.

A honeypot is thus a deception system that imitates a target system (also referred to as a "valuable target"). It misleads attackers into attacking the honeypot and exposing attack vectors that target the real, valuable target. For example, a web server (or the web server software) is a popular option that is mimicked by a honeypot. Since web servers make up a large portion of the public Internet, it is important to continuously monitor for threats targeting them.

Especially for the automotive industry, honeypots are of interest since there are hardly any data on real attacks. According to various embodiments, the honeypot 106 may, for example, be implemented in a vehicle. The computer network 100 may then at least partially include an internal network of the vehicle (but also a network that establishes connectivity to the vehicle from the outside, such as a mobile radio network).

Honeypots are thus bait resources that imitate a valuable target system in order to attract attackers. Honeypots are used in order to be attacked, so that defenders that closely monitor the systems gain insights about the strategies of the opponent. The value of these insights depends on the number of interaction possibilities that the honeypot offers to the attacker. If an attacker interacts with an imitation of a target system, entire attack paths can be uncovered, while a honeypot that only makes simpler interaction possible only allows parts of an attack to be uncovered. For example, a honeypot that only imitates a login shell only reveals what login credentials an attacker is attempting to use.

However, higher interaction possibilities carry greater risks: The attacker can either compromise the honeypot system itself or use it for later attacks on third parties. In order to address this risk, honeypots that, for example, only simulate the system shell of the mimicked target system (but do not really contain the system shell with all of its possibilities) can be used. Such a simulation can be implemented manually so that each individual shell command is reprogrammed for the simulation by the honeypot. However, since system shells generally contain many commands, this procedure typically implements only a small subset of shell commands that are likely to be used by attackers, in order to keep the effort within reason. However, this reduces the credibility of the honeypot and/or the interest of attackers in the honeypot.

According to various embodiments, an approach that makes automatic low-risk command line interface simulation (e.g., shell simulation) for various operating systems possible for use in honeypots is therefore provided. In this case, a command line interface is extensively simulated on the basis of a language model (in particular, a large language model (LLM), e.g., with the architecture of a neural transformer network). The thus simulated command line interface can then be used for a honeypot (e.g., automatically generating a honeypot uses the simulation in the honeypot). The language model (trained to simulate the command line interface) offers high system interaction to attackers without the risk of the honeypot being compromised and of a potential attack using the compromised honeypot (since the command line interface is only simulated).

Figure 2:
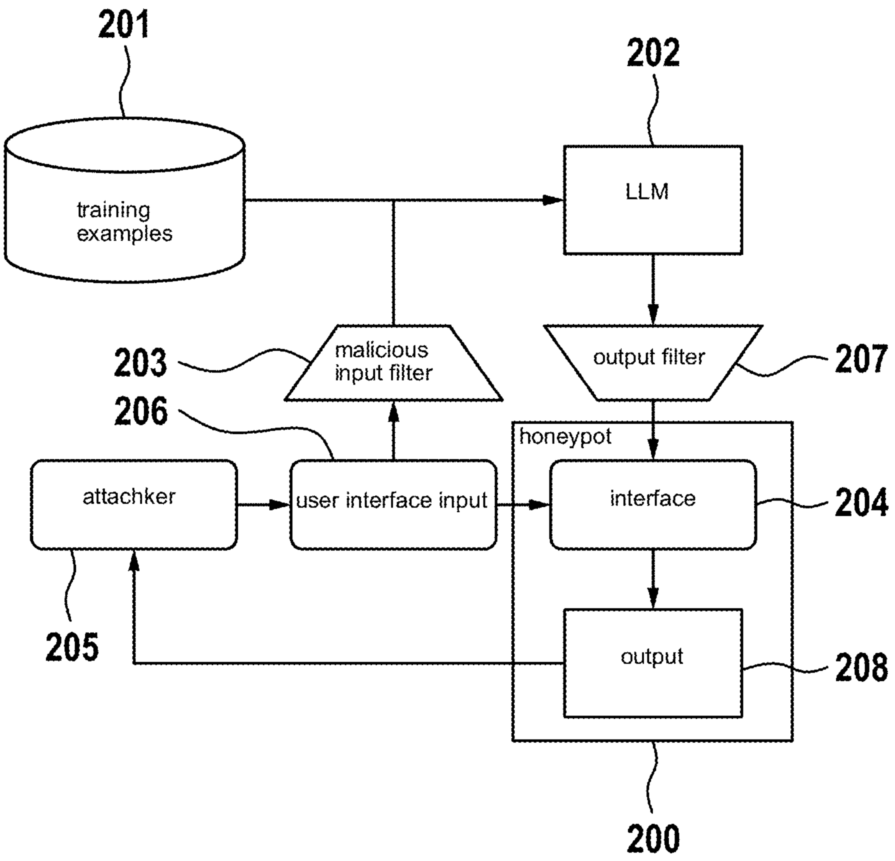
FIG. 2 illustrates the generation of a honeypot according to an example embodiment of the present invention.

FIG. 2 illustrates the generation of a honeypot 200 according to an embodiment.

Ascertaining a configuration for the honeypot (and, where applicable, also selecting an architecture, which is to be configured, for the honeypot) is carried out by a honeypot generation unit (or honeypot configuration unit), which corresponds, for example, to one of the user terminals 104 (e.g., a computer with which a user (such as a system administrator) configures the honeypot 106 and instructs the data processing device 105 to provision the thus configured honeypot 106). The here-described methods for generating a honeypot are thus, for example, carried out by such a honeypot generation unit (for example, automatically).

The following components are involved in the generation of the honeypot 200:

- Training examples 201: command line interface inputs and outputs of the command line interface of the specific target system that the honeypot 200 is to imitate and the command line interface of which an LLM is to mimic. Since various operating systems offer different types of functionality and syntax of their command line interfaces, the LLM 202 is trained to learn the the basic properties of the command line interface of the particular target system.
- Malicious input filter 203: In order to prevent detection by the attacker, command line interface inputs that are supplied to the LLM 202 during operation of the honeypot 200 and could cause incorrect output (on the basis of which the attacker could, for example, expose the honeypot as such) are filtered out. This is, for example, done automatically by means of a whitelist of command line interface commands of the target system. For all commands that are not on the whitelist, the honeypot outputs only system-specific error messages. Alternatively, a blacklist approach may also be used.
- LLM-based simulated command line interface 204: The LLM 202 simulates the command line interface of the target system (e.g., a system shell of the target system) within the honeypot 200 (i.e., the data processing device 105 implementing the honeypot 200 implements the LLM 202 for this purpose or (if it is, for example, implemented on another data processing device) accesses it). Attackers 205 can interact with the command line interface, and the LLM 202 generates textual feedback corresponding to the interaction of the attacker 205. The LLM-based command line interface 204 each user interface input 206 of the attacker 205 to the LLM 202 and outputs the output 208 generated therefrom (and, where applicable, filtered by an output filter 207) as response to the user interface input 206 of the attacker 205.

Inputs 206 of the attacker 105 may also be used to further train the LLM 202 (i.e., the base model for the simulated user interface 204). If it is observed which parts of the honeypot 200 are frequently inspected by attackers or which user interface commands (or the response of the honeypot 200 thereto) cause attackers to leave the honeypot 200, the LLM 202 can be improved. For example, (e.g., in the sense of reinforcement learning) the LLM 202 can receive a reward for a generated output 208 depending on how the attacker behaves in response to the output 208, for example how long the attacker continues to stay in the honeypot 200 or whether the attacker continues to pursue an attack in a particular area or changes the area.

The training can take place online (during an ongoing attack in order to adjust to the specific attack) if the further (re)training is relatively fast, or offline (after an attack) if, for example, an entire fleet of honeypots needs to be retrained. Attacker inputs to other honeypot systems can likewise be used for learning since attack strategies can generally be transferred to other operating systems.

If such a training (and thus a learning honeypot 200) is provided, the malicious input filter 203 can also be used to protect the LLM 202: One problem with a learning honeypot is an attacker deceiving the learning algorithm. Assuming, for example, that an attacker repeatedly executes a harmless command (e.g., creating a text file) without any other commands in between. The learning algorithm of the LLM 202 may assume that the attacker was expecting a different output and attempts to adjust the once correct output of the LLM 202. If so, the attacker can execute this same command on any system and receive either a correct response (=correct system) or an incorrect output (=honeypot) because the LLM 202 has learned incorrectly. Such poisoning attacks can be ruled out through filtering, i.e., it can be avoided that attackers influence the training of the LLM 202 such that the LLM 202 shows undesirable responses (from the perspective of the operator of the honeypot 202).

For example, the honeypot generation unit agent carries out the following:

1. Training the LLM 202 (as the base model for the honeypot 200) with the training examples (e.g., pairs of inputs and associated outputs) of the user interface of a target system that the LLM 202 is to mimic. Alternatively, it is also possible to take a pre-trained model and train it for this specific purpose. This pre-trained model should typically contain only non-critical information so that it can be used as the basis for the LLM 202 without filtering.
2. If critical information is incorporated into the training of the LLM 202, which could be the case because the LLM 202 is being trained to perform a particular function, the LLM 202 is filtered with respect to such critical content so that an attacker is not able to extract confidential content when the trained LLM 202 is used.
3. The LLM 202 is used to simulate the user interface 204 within the honeypot 200. The input 206 of an attacker 205 forms the prompt for the LLM 202. Alternatively, the input 206 may be extended or changed by the malicious input filter 203 before it is used as a prompt for the LLM 202.
4. The output 208 of the LLM 202 is then presented to the attacker 205. The output 208 may also be filtered by the output filter 207 (which, for example, filters out confidential information or meaningless or erroneous information (e.g., outputs on a blacklist)).
5. For continuous training of the LLM 202, data about attacks are collected in order to adjust the training accordingly, such as:
   - areas of the honeypot 200 that are attacked (i.e., attacker interest)
   - time investment of the attackers
   - information about what caused the attacker to leave the honeypot 200 (for example, during training, outputs after which the attacker left the honeypot 200, i.e., discontinued the communication, are penalized).

Steps 4 and 5 may be repeated in order to continuously improve the simulation and prolong the time investment of an attacker.

Figure 3:
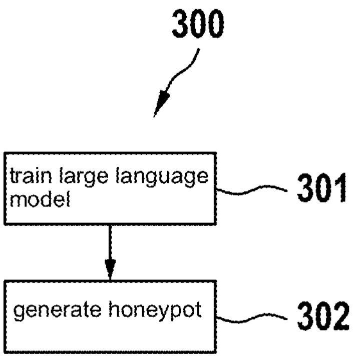
FIG. 3 shows a flowchart illustrating a method for generating a honeypot according to an example embodiment of the present invention.

In summary, a method is provided according to various embodiments, as shown in FIG. 3.

FIG. 3 shows a flowchart 300 illustrating a method for generating a honeypot according to an embodiment.

In 301, a large language model is trained to respond to operating system command line interface commands like a command line interface of the target system.

In 302, a honeypot is generated (and implemented or used), which uses the trained large language model to respond to operating system command line interface commands it receives (e.g., via a computer network) (i.e., the honeypot is configured in such a way that it forwards incoming command line interface commands to the large language model (i.e., generates corresponding prompts) and, according to the outputs of the large language model, responds to the command line interface commands).

The method of FIG. 3 can be carried out by one or more computers comprising one or more data processing units. The term "data processing unit" can be understood to mean any type of entity that makes the processing of data or signals possible. The data or signals can, for example, be processed according to at least one (i.e., one or more than one) specific function carried out by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the corresponding functions described in more detail here can also be understood as a data processing unit or logic circuitry. One or more of the method steps described in detail here can be performed (e.g., implemented) by a data processing unit by means of one or more specific functions executed by the data processing unit.

According to various embodiments, the method is thus, in particular, computer-implemented.

What is claimed is:

1. A method for generating a honeypot for a target system, comprising:

training a large language model to respond to operating system command line interface commands like a command line interface of the target system; and generating a honeypot that uses the trained large language model to respond to operating system command line interface commands the honeypot receives, wherein the generating of the honeypot includes generating the honeypot with an input filter configured to filter operating system command line interface commands that the honeypot has received such that:

the honeypot responds with an error message specific to the target system in response to each of the received operating system command line interface commands that fails to satisfy a criteria of the input filter; and the honeypot responds with an output of the trained large language model in response to each of the received operating system command line interface commands that satisfies the criteria of the input filter.

2. The method according to claim 1, further comprising:

generating the honeypot with an output filter that filters outputs of the large language model with regard to an output filter criterion before the outputs are used as responses to operating system command line interface commands that the honeypot has received.

3. The method according to claim 1, wherein each of the received operating system command line interface commands that fails to satisfy the criteria of the input filter is not provided to the trained large language model.

4. The method according to claim 1, further comprising:

continuing to train the large language model based on a behavior of an attacker in response to responses, generated using the large language model, to the operating system command line interface commands.

5. The method according to claim 4, wherein the continuing to train the large language model based on the behavior of the attacker includes:

subsequent to the large language model generating a response, the large language model receiving a reward based on the behavior of the attacker indicating the attacker continued to stay in the honeypot for at least a threshold amount of time.

6. The method according to claim 4, wherein the continuing to train the large language model based on the behavior of the attacker includes:

subsequent to the large language model generating a response to a first operating system command line interface command associated with a first area of the honeypot, the large language model receiving a reward based on the behavior of the attacker indicating the attacker initiating a second operating system command line interface command associated with the first area of the honeypot.

7. The method according to claim 4, wherein the continuing to train the large language model based on the behavior of the attacker includes:

subsequent to the large language model generating a response to a first operating system command line interface command associated with a first area of the honeypot, the large language model receiving a reward based on the behavior of the attacker indicating the attacker initiating a second operating system command line interface command associated with a second area of the honeypot that is different from the first area of the honeypot.

8. The method according to claim 4, wherein the continued training is a reinforcement learning, and wherein the continuing to train the large language model based on the behavior of the attacker includes:

the large language model receiving a reward which depends on how long the attacker continues to stay in the honeypot after receiving a response from the honeypot to a first operating system command line interface command.

9. The method according to claim 4, wherein the continued training is a reinforcement learning, and wherein the continuing to train the large language model based on the behavior of the attacker includes:

the large language model receiving a reward which depends on whether the attacker continues to pursue an attack after receiving a response from the honeypot to a first operating system command line interface command.

10. The method according to claim 4, wherein the continued training is a reinforcement learning, and wherein the continuing to train the large language model based on the behavior of the attacker includes:

the large language model receiving a reward which depends on whether the attacker pursues a different attack after receiving a response from the honeypot to a first operating system command line interface command which represents a first attack.

11. A honeypot generation unit for generating a honeypot for a target system, the honeypot generation unit comprising at least one processor configured to:

train a large language model to respond to operating system command line interface commands like a command line interface of the target system; and generate a honeypot that uses the trained large language model to respond to operating system command line interface commands the honeypot receives, wherein to generate the honeypot includes to generate the honeypot with an input filter configured to filter operating system command line interface commands that the honeypot has received such that:

the honeypot responds with an error message specific to the target system in response to each of the received operating system command line interface commands that fails to satisfy a criteria of the input filter; and the honeypot responds with an output of the trained large language model in response to each of the received operating system command line interface commands that satisfies the criteria of the input filter.

12. The honeypot generation unit according to claim 11, wherein each of the received operating system command line interface commands that fails to satisfy the criteria of the input filter is not provided to the trained large language model.

13. A non-transitory computer-readable medium on which are stored commands generating a honeypot for a target system, the commands, when executed by a processor, causing the processor to perform:

training a large language model to respond to operating system command line interface commands like a command line interface of the target system; and generating a honeypot that uses the trained large language model to respond to operating system command line interface commands the honeypot receives, wherein generating the honeypot comprises generating the honeypot with an input filter configured to filter operating system command line interface commands that the honeypot has received such that:

the honeypot responds with an error message specific to the target system in response to each of the received operating system command line interface commands that fails to satisfy a criteria of the input filter; and the honeypot responds with an output of the trained large language model in response to each of the received operating system command line interface commands that satisfies the criteria of the input filter.

14. The non-transitory computer-readable medium according to claim 13, wherein each of the received operating system command line interface commands that fails to satisfy the criteria of the input filter is not provided to the trained large language model.

* * * * *